UNITED STATES PATENT OFFICE.

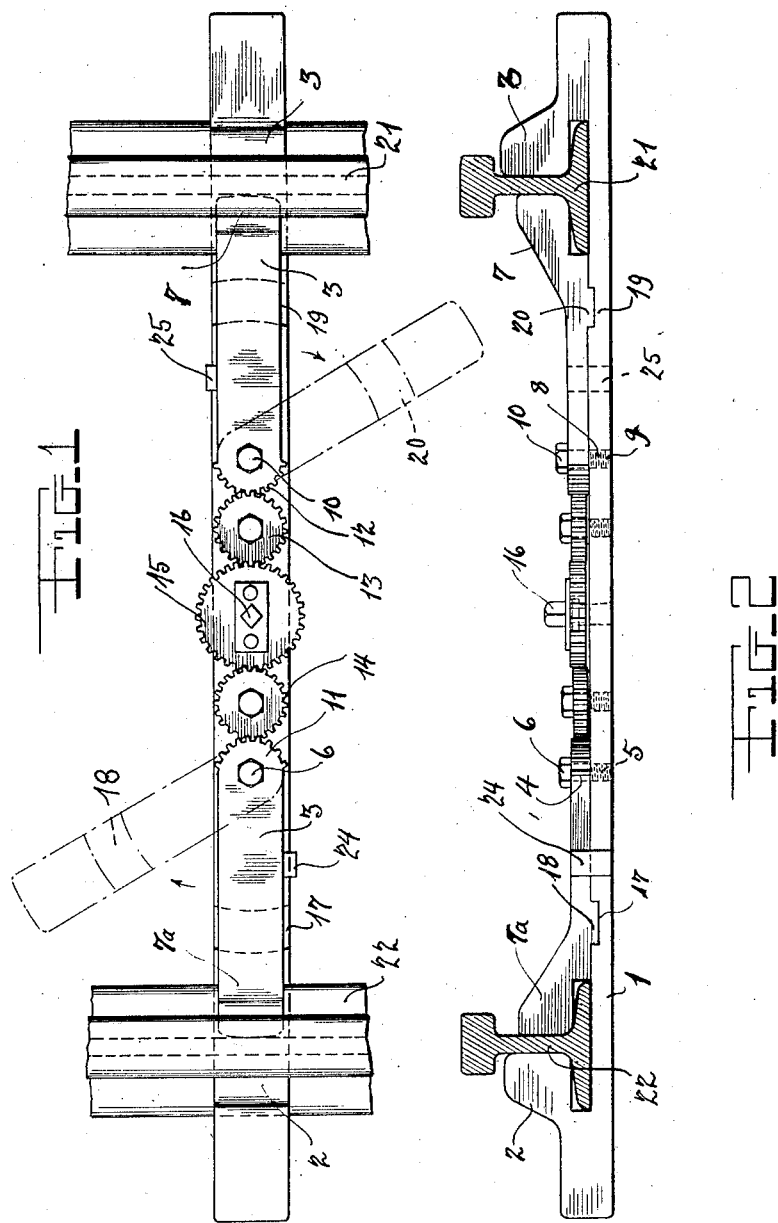
E. KAMIENSKI.
RAIL TIE.
APPLICATION FILED AUG. 6, 1920.
1,357,570. Patented Nov. 2, 1920.

EDWARD KAMIENSKI, OF CHROME, NEW JERSEY.

RAIL-TIE.

1,357,570.  Specification of Letters Patent.  Patented Nov. 2, 1920.

Application filed August 6, 1920. Serial No. 401,588.

*To all whom it may concern:*

Be it known that I, EDWARD KAMIENSKI, citizen of Poland, and resident of Chrome, in the county of Hudson and State of New Jersey, have invented certain new and useful Improvements in Rail-Ties, of which the following is a specification.

This invention relates to rail ties, and has for its main object the provision of an adjustable tie to hold the rails securely and at the same time to allow of their quick removal or replacement without great expense or effort, as is occasioned by the types of rail ties now generally used.

The above and other objects will become apparent in the description below, in which characters of reference refer to like-named parts in the drawings.

Referring briefly to the drawings, Figure 1 is a plan view illustrating my device and the manner of its operation.

Fig. 2 is a side elevational view of the same.

Referring now in detail to the drawings, the numeral 1 represents the main base of the device, and 2 and 3 are outside supports for the rails 22 and 21 respectively. Removable inside rail supports 7 and 7ª are provided pivotally mounted at 8 and 4 respectively in the base 1. At the pivot 4 a screw 5 having a head 6 passes through the member 7ª and the base 1, and is adapted both to provide the pivot about which the member 7ª may swing, and also to lock said member against pivotal motion, when the latter is not desired. Similarly, at the pivotal point 8, a screw 9 having a head 10 passes through the member 7 and the base 1. Circular or arcuate slots or grooves 17 and 19 are provided in the upper surface of the base 1 for the guidance of similarly shaped ridges 18 and 20, respectively, on the members 7ª and 7, respectively. By means of these ridges and grooves, the members 7ª and 7 are prevented from moving in a direction parallel to the base 1, and at the same time said ridges and grooves give rigidity to the structure.

A main or operating wheel or gear 15 is mounted approximately midway between the rails 22 and 21 on the base 1, and has an upwardly extending boss 16 adapted to receive a wrench or the like and to be turned thereby. From said gear 15 communication is established with the member 7 through an idle gear 13 and the toothed sector 12 comprising the end of the member 7. Similarly, the toothed sector 11 of the member 7ª is in mesh with the idle gear 14, the latter in turn being in mesh with the main gear 15.

Stops 24 and 25 are provided extending upward from the base 1, as shown to limit the counter-clockwise motion of the members 7 and 7ª so that after the same arrive at substantial coincidence with the base 1, further motion is prevented.

The operation of the device is readily apparent. Suppose, for instance, that the rails 22 and 21 have become worn and it is necessary to replace them. Then a wrench is applied to the boss 16 of the main gear 15, and the said gear is turned in a clockwise direction, thereby causing the members 7ª and 7 to recede from the rails 22 and 21 respectively in the manner apparent in Fig. 1. The rails are then removed, and the new ones are placed up against the outside supports 2 and 3. Thereupon the gear 15 is turned in a counter-clockwise direction, and the members 7ª and 7 are again brought up against the rails so as to securely hold them in position. It is thus obvious that I have invented a practical and labor saving rail tie.

I claim:

1. An adjustable rail tie comprising a base, supports rigid therewith adapted to fit against the outsides of the rails, supports adapted to fit against the insides of said rails, said latter supports being pivotally mounted on said base, arcuate slots in said base, arcuate ridges on said last-named supports adapted to slide in said slots, toothed sectors on said supports, a main gear pivoted in said base, gears communicating between said main gear and said sectors, said main gear having means for receiving a tool for turning the same.

2. An adjustable rail tie comprising a base, supports rigid therewith adapted to fit against the outsides of the rails, supports adapted to fit against the insides of said rails, said latter supports being pivotally mounted on said base, arcuate slots in said base, arcuate ridges on said last-named supports adapted to slide in said slots, toothed sectors on said supports, a main gear pivoted in said base, gears communicating between said main gear and said sectors, said main gear having means for receiving a tool for turning the same, and stops rigid with said base for limiting the turning motion of said inside supports.

Signed at Chrome, in the county of Middlesex and State of New Jersey this 18 day of February A. D. 1920.

EDWARD KAMIENSKI.